(12) United States Patent
Martin

(10) Patent No.: US 10,853,606 B2
(45) Date of Patent: Dec. 1, 2020

(54) ENCODED SURFACES THAT ARE READ BY THREE-DIMENSIONAL RADAR IMAGING SYSTEMS

(71) Applicant: Auto Drive Solutions S.L., Madrid (ES)

(72) Inventor: Alejandro Badolato Martin, Madrid (ES)

(73) Assignee: AUTO DRIVE SOLUTIONS S.L., Madrid (ES)

( * ) Notice: Subject to any disclaimer, the term of this patent is extended or adjusted under 35 U.S.C. 154(b) by 0 days.

(21) Appl. No.: 16/464,266

(22) PCT Filed: Nov. 25, 2016

(86) PCT No.: PCT/IB2016/057119
§ 371 (c)(1),
(2) Date: May 25, 2019

(87) PCT Pub. No.: WO2018/096388
PCT Pub. Date: May 31, 2018

(65) Prior Publication Data
US 2019/0392185 A1   Dec. 26, 2019

(51) Int. Cl.
*G06K 7/14* (2006.01)

(52) U.S. Cl.
CPC .................. *G06K 7/1404* (2013.01)

(58) Field of Classification Search
CPC ............. G06K 7/1404; G06K 9/3216; G06K 9/00791; G06K 19/06046; G06K 7/10376; G06K 19/06037; G06K 7/1417; G05D 1/0257; G05D 1/0251
See application file for complete search history.

(56) References Cited

U.S. PATENT DOCUMENTS

| 2,996,137 A | 8/1961 | Yaohan et al. |
| 6,529,154 B1 | 3/2003 | Schramm et al. |
| 9,665,779 B2* | 5/2017 | Ooi ............... G06K 9/00798 |
| 2018/0052464 A1* | 2/2018 | Badolato Martin .. G01S 13/751 |

FOREIGN PATENT DOCUMENTS

| ES | 2184602 | 4/2003 |
| WO | 2016180992 | 11/2016 |

OTHER PUBLICATIONS

International Search Report dated Sep. 5, 2017.
Written Opinion dated Sep. 5, 2017.

* cited by examiner

*Primary Examiner* — Seung H Lee
(74) *Attorney, Agent, or Firm* — Aslan Law, P.C.

(57) ABSTRACT

The invention relates to encoded surfaces that are read by a three-dimensional radar imaging system. The reader scans different zones in a pre-determined area of the encoded surface, each of said zones comprising projections or indentations, similar to Braille. The image obtained can be used to estimate the position of the camera relative to the known pattern. The relative movement between the reader and the encoded surface allows other areas of the surface to be scanned and, in this way, the sensor can decode a message etched along the path followed by the imaging sensor.

4 Claims, 1 Drawing Sheet

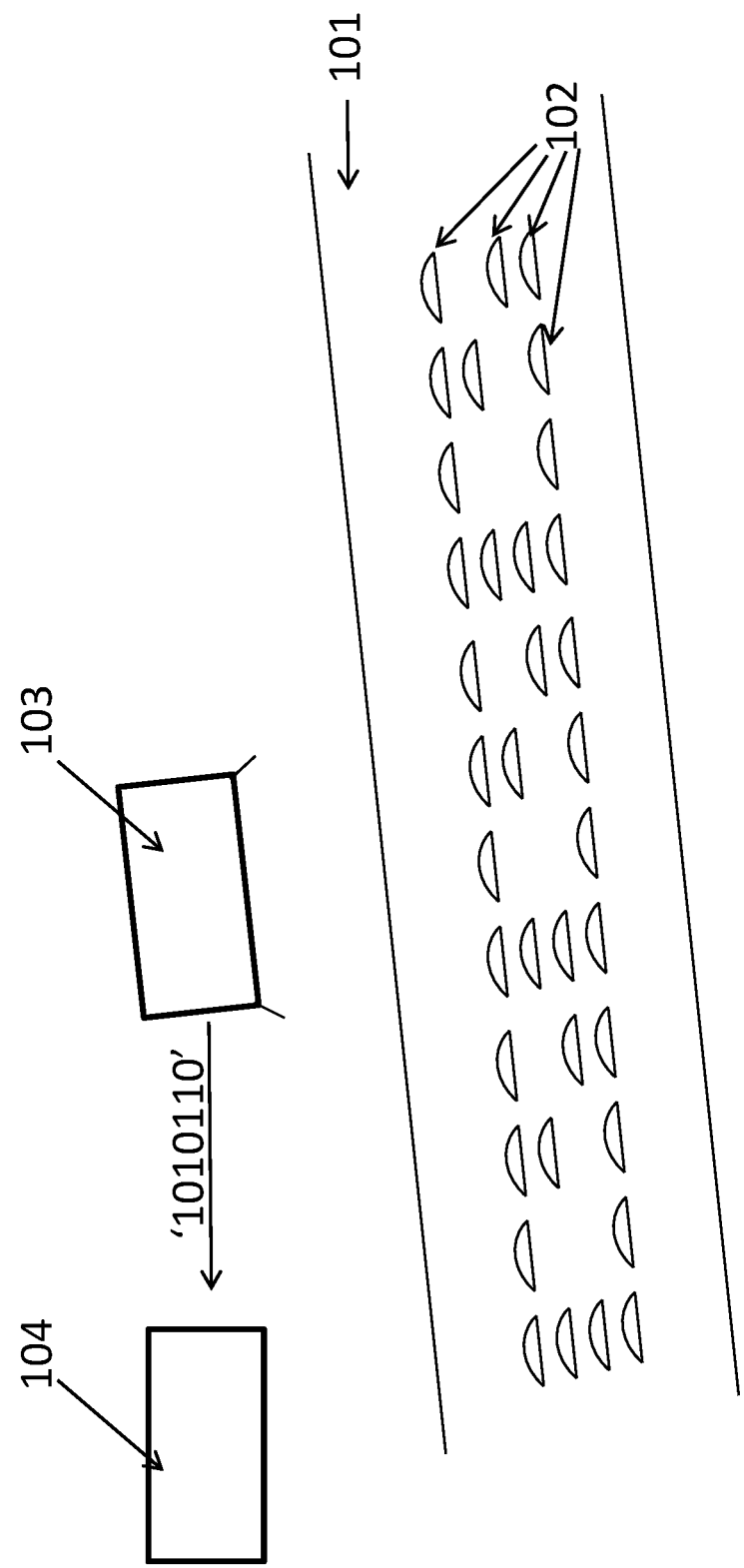

ENCODED SURFACES THAT ARE READ BY THREE-DIMENSIONAL RADAR IMAGING SYSTEMS

CROSS-REFERENCE TO RELATED APPLICATION

This application is a 35 U.S.C. § 371 national stage application of PCT Application No. PCT/IB2016/057119, filed on Nov. 25, 2016, which is incorporated herein by reference in their entireties. The above-referenced PCT International Application was published as International Publication No. WO2018/096388 A1 on May 31, 2018.

OBJECT OF THE INVENTION

The proposed invention relates to encoded surfaces that are read by a three-dimensional radar imaging system during the displacement of the reader.

The reader examines different zones of a determined area of the encoded surface where each one of the zones exhibits protrusions or indentations similar to the braille coding system.

The image obtained allows the position of the camera to be estimated with respect to the known pattern.

The relative movement of the reader with respect to the encoded surface allows other areas of the surface to be examined and in this way the sensor is capable of decoding a message recorded along the trajectory followed by the image sensor.

These encoded surfaces can be used, amongst other things, to determine the absolute position of the reader, provided information is encoded about the position with respect to an absolute coordinate system in the surface and the reader is capable of determining its relative position and said information.

It also serves to identify that the reader has scanned a surface encoded with a determined pattern which identifies an object and even for systems of numeric control of objects.

FIELD OF THE INVENTION

The field of the invention is the high-tech industry of positioning and control of mobile phones and objects which can be applied preferably in surface transport devices and in assembly lines or cranes.

BACKGROUND OF THE INVENTION

There is some background for devices which carry out a similar information reading function.

Among which, the inventor is also the inventor of the international patent PCT/ES2015/070378 where as an encoding means a rail guide is described installed at the level of the road surface, although it can optionally be hidden under a layer of asphalt treated with a layer of hydrophobic material with preferred dimensions of 1.5 cm width by 5 cm depth and where hollows are machined in its interior, the preferred form of the hollows being dihedrals since the planes of the dihedrals increase the reflected signal, therefore facilitating its detection.

Similarly, the same inventor has registered the international patent PCT/IB2016/051159 where other information means are detailed with the same purpose. These reading and information encoding systems have more applications wherein it is not necessary for the sensor to be installed on a mobile phone and the encoded information does not have the sole purpose of determining the relative position of the sensor with respect to the encoded medium.

But the case where the reader not only examines in one pointing direction, but rather is capable of exploring an area of the surface, obtaining a three-dimensional image where there are determined protrusions of variable thickness or indentations with different depth has not been thus far resolved and this is what the proposed invention achieves.

There is no prior art known by the inventor incorporating the arrangements presented in the present invention, nor the advantages which said arrangement entails.

BRIEF DESCRIPTION OF THE DRAWINGS

FIG. 1 is a functional block diagram illustrating a three-dimensional radar imaging system according to one or more embodiments described herein.

DESCRIPTION OF THE INVENTION

The proposed invention relates to encoded surfaces 102 that are read by a three-dimensional radar imaging system 103 as illustrated in, for example, FIG. 1. The reader examines different areas of a determined area of the encoded surface where each one of the areas presents protrusions or indentations similar to the braille encoding system. The image obtained allows the position of the camera to be estimated with respect to the known pattern.

The relative movement of the reader with respect to the encoded surface allows other zones of the surface 101 (e.g., asphalt) to be examined and in this way the sensor is capable of decoding a message recorded along the trajectory followed by the image sensor.

These encoded surfaces can be used, amongst other things, to determine the absolute position of the reader, provided information is encoded about the position with respect to an absolute coordinate system in the surface and the reader is capable of determining its relative position and said information via element 104 (e.g., a data decoder and positioning system). It also serves to identify that the encoded surface has overrun the sensor or vice versa and even for systems of numeric control of objects.

The information is extracted by means of detecting the borders of dielectric change of the medium or by means of detecting the dielectric metal borders where the changes are detected by means of image sensors such as high resolution radar device or other similar detector These borders are examined by means of a sensor for pressure or electromagnetic waves and, by measuring the time taken by the ways to return to the sensor, it is possible to determine the distances at which that reflections are produced and thereby extract the information. The information is encoded by means of various mechanisms. One of these is to modify the thickness of the protrusions or the depth of the indentations. Another mechanism is to locate the projection or indentation in a determined position with respect to the other projection or indentation. A third mechanism is to combine the two foregoing mechanisms.

It is possible to replace the image radar sensor, which is capable of examining different zones of the explored area by means of electronic pointing, with a set of sensors distributed on the axis transversal to the trajectory and separated from each other by a determined distance such that the senses coincide with the longitudinal axes where the information is encoded. When the sensors at the ends are detecting the projections on each transversal axis, the information resides in the detection of a projection which is detected by one or another intermediate sensor.

An exemplary application which emerges from this reading and encoding system is the guidance and positioning of vehicles where a surface close to the location where the vehicle is displayed is encoded and where the vehicle incorporates a three-dimensional image system. Another application is the identification of objects which encode in their surface information with a determined pattern and a radar reader which detects add patterns.

PREFERRED EMBODIMENT OF THE INVENTION

The preferred embodiment consists of an infrastructure which has paint speckles on its surface along its trajectory.

The paint speckles have a 1 cm squared surface and a thickness of 0.5 cm. The information is encoded, having two paint speckles with a separation of 10 cm on an axis perpendicular to that of the trajectory of the infrastructure. The locating of a third paint speckle between both determines the logic level of the transversal axes as is described:

1 speckle separated by 2 cm from the left speckle in the direction of travel of the vehicle determines a logic level 1.

1 speckle separated by 4 cm from the left speckle in the direction of travel of the vehicle determines a logic level 0.

1 speckle separated by 6 cm from the left speckle in the direction of travel of the vehicle determines a logic level word start bit.

1 speckle separated by 8 cm from the left speckle in the direction of travel of the vehicle determines the logic level word end bit.

The information is encoded forming words starting with a start bit, then 64-bit of data 1 or 0 are encoded and lastly they have a stop bit. The separation between each one of the transversal axes where 3 speckles are encoded is 2 cm.

This encoded surface is read by means of high resolution radar which, coupled to the underside of the vehicle, has electronic pointing capacity and explores each square centimetre of a visual field of approximately 50×50 cm squared.

In addition, the sensor can be coupled to the vehicle via a motorised mobile transversal axis which allows it to be displaced from one wheel to another to facilitate the reading.

The displacement of the vehicle along the trajectory allows other zones of the medium to be examined and in this way the sensor is capable of decoding a message recorded about the situation and positioning With the nature of the invention sufficiently described and the manner of putting it into practice, it should be stated that the arrangements previously indicated and represented in the attached drawings can be modified in detail once they do not alter their fundamental principles, established in the previous paragraphs and summarised in the following claims.

What is claimed is:

1. Encoded surfaces that are read by a three-dimensional radar imaging system, the encoded surfaces comprising:
   surfaces encoded by shapes which can be readable by sensitive readers located apart for reading the surface encoded by shapes,
   wherein sensitive readers emit pressure or electromagnetic waves to examine each one of a plurality of zones of an explored area and obtain information on a distance at which each one of possible reflections is produced due to a change between a boundary between two different media, and
   wherein information being encoded in an axis transversal to a trajectory is defined by a presence of two projections, including a first projection and a second projection, separated by x cm from one another and a third projection located between said two of said projections with respect to said first projection in a direction of travel of said trajectory, in the following manner:
   a) at a distance of A cm to associate said axis with a logic level 0;
   b) at a distance of B cm to associate said axis with a logic level 1;
   c) at a distance of C cm to associate said axis with a logic level word start bit; and
   d) at a distance of D cm to associate said axis with a logic level word end bit,
   wherein A<B<C<D<X, and
   wherein A>0.

2. The encoded surfaces according to claim 1 wherein said surface has projections and indentations arranged on axis transversal to a trajectory and a reader is formed by a radar configured to emit energy by pressure or electromagnetic waves to examine each one of said zones of said explored area and detects the presence of said projections and said indentations arranged on said axis by determining a distance at which a reflection is produced due to a change between a boundary between two different media.

3. Encoded surfaces that are read by a three-dimensional radar imaging system, the encoded surfaces comprising:
   a plurality of paint speckles disposed on the encoded surface along a trajectory of the encoded surface and wherein said paint speckle have a surface of 1 cm squared and a thickness of 0.5 cm wherein information being encoded is defined by two paint speckles including a left paint speckle and a right paint speckle with a separation of 10 cm on an axis perpendicular to that of said trajectory;
   said paint speckles including a third paint speckle wherein locating of said third paint speckle between said two paint speckles determines logic levels of a transversal axis wherein:
   said third paint speckle is separated by 2 cm from said left speckle in a direction of travel of a vehicle defining a logic level 1;
   said third paint speckle is separated by 4 cm from said left speckle in the direction of travel of the vehicle defining a logic level 0;
   said third paint speckle is separated by 6 cm from said left speckle in the direction of travel of the vehicle defining a logic level word start bit;
   said third paint speckle separated by 8 cm from said left speckle in the direction of travel of the vehicle defining a logic level word end bit;
   wherein separation between each one of said transversal axes where said paint speckles are encoded is 2 cm;
   wherein information being encoded forms words starting with a start bit, then 64-bit of data including 1 or 0, and lastly a stop bit;
   wherein the encoded surface is read by a high resolution radar coupled to an underside of the vehicle, having an electronic pointing capacity and configured to explore each square centimeter of a visual field of approximately 50×50 cm squared; and
   wherein a sensor is coupled to the vehicle via a motorized mobile transversal axis allowing said sensor to be displaced from one wheel to another to facilitate with the reading.

4. The encoded surfaces according to claim 3 wherein information being encoded in said axis transversal to said trajectory is defined by a presence of two of said projections, including a left projection and a right projection, separated by 10 cm from one another and a third projection located between said two of said projections with respect to said left projection in a direction of travel of said trajectory, in the following manner:
   a) at a distance of 2 cm to associate said axis with a logic level 0;
   b) at a distance of 4 cm to associate said axis with a logic level 1;
   c) at a distance of 6 cm to associate said axis with a logic level word start bit; and
   d) at a distance of 8 cm to associate said axis with a logic level word end bit.

\* \* \* \* \*